United States Patent [19]

Tokiwa et al.

[11] Patent Number: 5,256,711
[45] Date of Patent: Oct. 26, 1993

[54] STARCH-CONTAINING BIODEGRADABLE PLASTIC AND METHOD OF PRODUCING SAME

[75] Inventors: Yutaka Tokiwa, Tsuchiura; Sigeyuki Takagi; Masatoshi Koyama, both of Tsukuba, all of Japan

[73] Assignees: Director-General of Agency of Industrial Science; Technology Research Institute of Innovative Technology for the Earth; Chuo Kagaku Co., Ltd., all of Japan

[21] Appl. No.: 955,025

[22] Filed: Oct. 1, 1992

[30] Foreign Application Priority Data

Oct. 4, 1991 [JP] Japan ................. 3-283847
Nov. 7, 1991 [JP] Japan ................. 3-319899

[51] Int. Cl.$^5$ .................. 525 411; 525 415; 525 450; C08J 1/26
[52] U.S. Cl. .................. 524/47; 523/124; 523/125
[58] Field of Search ........... 523/124, 125; 524/47; 525/411, 415, 450

[56] References Cited

U.S. PATENT DOCUMENTS

| | | |
|---|---|---|
| 3,850,863 | 11/1974 | Clendinning . |
| 4,133,784 | 1/1979 | Otey et al. . |
| 4,337,181 | 6/1982 | Otey et al. .......... 524/522 |
| 5,108,807 | 4/1992 | Tucker .............. 428/35.2 |

FOREIGN PATENT DOCUMENTS

| | | |
|---|---|---|
| 327505 | 9/1989 | European Pat. Off. . |
| 444880 | 4/1991 | European Pat. Off. . |

*Primary Examiner*—John Kight, III
*Assistant Examiner*—T. Mosley
*Attorney, Agent, or Firm*—Lorusso & Loud

[57] ABSTRACT

A biodegradable plastic composition, which may be in the form of a molded body, includes gelatinized starch and a biodegradable, aliphatic polyester resin having a melting point of 45°–130° C. The plastic is produced by kneading a blend containing a starchy substance selected from non-gelatinized, granular starch and gelatinized starch and the aliphatic polyester resin at a temperature higher than the melting point of the aliphatic polyester in the presence of water in an amount of 1–45 % based on the weight of the starchy substance.

11 Claims, No Drawings

STARCH-CONTAINING BIODEGRADABLE PLASTIC AND METHOD OF PRODUCING SAME

BACKGROUND OF THE INVENTION

This invention relates to a biodegradable plastic material and a method of preparing same.

There is an increasing demand for a plastic material which is decomposed by the action of microorganisms, (bacteria, yeast, fungi, etc.) or enzymes, thereby destroying to the original shape.

One well known biodegradable plastic material includes a mixture of starch with a synthetic polymer such as a polyethylene (ANTEC' 89, 1351-1355), an ethylene/acrylic acid copolymer (US-A-4,138,784 and 4,337,181) or an ethylene/vinyl alcohol copolymer (JP-A-Hei-3-31333).

In the above polyethylene-containing plastic material, the starch is present as a filler within a matrix of the polyethylene which is not biodegradable. Thus, the biodegradability of this material is not satisfactory. While the plastic material containing the ethylene/acrylic acid copolymer has superior water resistance and mechanical properties as compared with the polyethylene-containing plastic material, the biodegradability is less satisfactory. Regarding the ethylene/vinyl alcohol copolymer-containing plastic material, the composition of the copolymer is not disclosed so that it is not clear whether or not the copolymer is biodegradable. This material has a problem in that pin holes are apt to be formed in films obtained therefrom because bubbles are unavoidably formed by vaporization of water during kneading of the raw materials.

SUMMARY OF THE INVENTION

The present invention has been made with the foregoing problems of the conventional plastic materials in view. In accordance with one aspect of the present invention there is provided a biodegradable plastic material comprising a mixture of gelatinized starch with a biodegradable, aliphatic polyester resin having a melting point of 45°-130° C.

In another aspect, the present invention provides a method of producing a biodegradable plastic material, comprising the steps of:

providing a blend containing a starchy substance selected from non-gelatinized, granular starch and gelatinized starch and a biodegradable, aliphatic polyester resin having a melting point of 45°-130° C.; and kneading said blend at a temperature higher than the melting point of said aliphatic polyester but lower than the decomposition temperature of said starchy substance in the presence of water in an amount of 1-45% based on the weight of said starchy substance.

In a further aspect, the present invention provides a biodegradable plastic material comprising a matrix of a biodegradable, aliphatic polyester resin having a melting point of 45°-130° C., and gelatinized starch dispersed in said matrix and is present in an amount of 30-90% based on the total weight of said aliphatic polyester resin and said gelatinized starch.

The present invention also provides a process for producing a biodegradable plastic molding, comprising the steps of:

providing a molten mixture containing a biodegradable, aliphatic polyester resin having a melting point of 45°-130° C. and gelatinized starch, wherein the weight ratio of said polyester resin to said gelatinized starch is 10:90 to 70:30; and extruding said mixture through a die under the conditions satisfying the following expressions:

$$100 > n_s/n_e \geq 0.8$$

$$n_e \geq 600$$

wherein $n_e$ and $n_s$ stand for the viscosity, in terms of poise, of the aliphatic polyester resin and the gelatinized starch, respectively, at the extrusion temperature.

DESCRIPTION OF THE PREFERRED EMBODIMENTS

The present invention will now be described in detail below.

The term "starch" as used herein is intended to refer to any type of non-modified and modified starches and includes starches or starch-containing materials of natural, vegetable origin composed mainly of amylose and/or amylopectin, and modified starch products. Illustrative of suitable starches and starch-containing materials are potato starch, corn starch, wheat starch, tapioca starch, rice starch, sweat potato starch, sago starch, waxy corns, high amylose corns, wheat flour and rice flour. Polysaccharides such as guar gum, chitin and chitosan may also be usable. Examples of modified starch products include starches onto which a monomer such as an acrylate, a methacrylate, an olefin or styrene is grafted; products obtained by reaction of starches with a fatty acid; and starches modified by dextrinization, oxidation, acidification, alphanization, etherification, esterification and cross-linking. In addition, destructurized starches obtained by heat-treating water-containing starch at a temperature of 105°-190° C. (EP-A-0327505) are included within the scope of the modified starches.

The term "gelatinized starches" as used herein is intended to refer to products obtained by treating the above starches by any known gelatinization method such as by heating in the presence of water at a temperature of about 40° C. or more. Gelatinization may also be effected by kneading starch granules in the presence of 1-45% by weight of water for a period of time sufficient to disrupt the granules.

The term "plastic material" as used herein is intended to refer both to a plastic composition to be used as raw material for the production of shaped or molded articles and to a plastic molding or shaped body obtained from the composition.

The aliphatic polyester resin used in the present invention should be biodegradable. Illustrative of suitable biodegradable polyester resin are polyethylene adipate, polyethylene suberate, polyethylene azelate, polyethylene decamethylate, polytetramethylene succinate, polytetramethylene adipate, polypropiolactone, polycaprolactone and block copolymers of the above esters with polyamide. The use of polycaprolactone is especially preferred. It is also important that the aliphatic polyester resin have a melting point of 45- 130° C., preferably 50°-120° C. When the melting point is lower than 45° C., the resulting molded product tends to thermally deform at room temperature. Too high a melting point in excess of 130° C. is disadvantageous because vaporization of water considerably occurs to cause the formation of bubbles in the molded product.

The biodegradable plastic material according to the present invention comprises a mixture of the above gelatinized starch with the above biodegradable, aliphatic polyester. The amount of the gelatinized starch is generally 2-98%, preferably 10-95%, more preferably 30-90%, most preferably 40-85%, based on the total weight of the gelatinized starch and the aliphatic polyester.

In addition to the above mixture, the plastic material of this invention may contain various additives such as a biodegradable plasticizer, a weatherability improving agent (e.g. UV stabilizer), a germicide, a herbicide, a fertilizer, an anti-oxidation agent, a surfactant, a filler, a starch stabilizer and a pigment. Illustrative of suitable plasticizers are ethylene glycol, propylene glycol, polyethylene glycol and polypropylene glycol with a number average molecular weight of 200-4000, glycerin and sorbitol. The plasticizer is used in an amount of 0.5-100% based on the weight of the gelatinized starch.

The plastic material may be prepared by kneading a blend of ungelatinized or gelatinized starch, an aliphatic polyester resin and an additive (optional) in the presence of water at a temperature higher than the melting point of the aliphatic polyester resin but lower than the decomposition point of the starch. When polycaprolactone is used as the aliphatic polyester resin, the kneading is generally performed at a temperature of 70°-130° C., preferably 80°-110° C. Ungelatinized starch is gelatinized as a result of the kneading. The amount of the water is generally 1-45%, preferably 12-45%, based on the weight of the starch on dry basis. The water to be present in the kneading system may be derived from that contained in the raw material starch and/or that added at the start of the kneading operation. The kneaded mixture is then shaped into any desired shape such as a pellet, sheet, film, plate, rod, pipe or receptacle. In one preferred embodiment according to the present invention, gelatinization of starch, kneading and molding are simultaneously performed using an extruder.

The plastic material according to the present invention preferably has a structure in which the aliphatic polyester resin, which exhibits good resistance to water, forms a matrix and the gelatinized starch, which is poor in water resistance, is dispersed in the matrix. Such a plastic material exhibits satisfactory resistance to water since the gelatinized starch which is poor in water resistance is covered with the matrix of the aliphatic polyester resin which has good resistance to water.

The plastic material in which the polyester resin forms a matrix may be suitably obtained extruding a molten mixture of an aliphatic polyester and gelatinized starch through a die under the conditions satisfying the following expressions:

$100 > n_s/n_e \geq 0.8$, preferably $50 > n_s/n_e \geq 0.8$, and
$n_e \geq 600$, preferably $n_e > 900$ wherein $n_e$ and $n_s$ stand for the viscosities, in terms of poise, of the aliphatic polyester resin and the gelatinized starch, respectively, at the extrusion temperature. The above conditions can be achieved by suitably selecting the kind and/or the molecular weight of the aliphatic polyester resin and/or by suitably selecting the water content of the gelatinized starch. As described previously, ungelatinized starch may be fed as such to an extruder since gelatinization thereof occurs before extrusion through the die.

The plastic material of this invention is capable of being consumed by microorganisms in an environment suitable for the growth of the microorganisms to cause reduction of the weight and volume of the plastic material with time. Thus, the plastic material may be used as daily necessaries such as disposable packages in the form of a case, a bottle or the like receptacle, as agricultural materials such as a green house construction film, a soil cover sheet, a nursery pot, a fertilizer bag or a pesticidal carrier, as a leisure goods such as a bag, a packing material for fishing equipments and as a material for drug delivery systems.

The following examples will further illustrate the present invention. Percentages are by weight.

Preparation of Plastic Materials

Example 1

Granular cornstarch (9217 g) having a water content of 13.2% was placed into a kneader, over which were sprayed 783 g of water. The total water content is 25% based on the weight of the starch on dry basis. After the contents in the kneader had been kneaded for about 1 hour, 2000 g of polycaprolactone (PCL) were added and the mixture was kneaded for about 30 minutes. The resulting mixture was charged into a hopper of a biaxial extruder and extruded through a T-die at a feed rate of 10 kg/hour, a screw revolution speed of 100 rpm and a barrel temperature gradient of 30°-80°-95° C. to obtain a uniform film free of air bubbles. The $n_e$ and $n_s$ values measured at 95° C. with a flow tester (orifice diameter: 1 mm) are found to be 113,000 poises and 1,600,000 poises, respectively, so that $n_s/n_e$ is 14.2.

Examples 2-4

Example 1 was repeated in the same manner as described except that the amount of water sprayed was changed to 1183 g (total water content: 30%), 1983 g (total water content: 40%) and 0 g (total water content: 15.2%). The films thus obtained were uniform and free of air bubbles.

Example 5

Granular cornstarch having a water content of 13.2% was placed into an oven and maintained at 110° C. until the water content of 6% was reached. The resulting cornstarch (8511 g) was kneaded together with 2000 g of PCL for about 1 hour. The resulting mixture was then extruded in the same manner as that in example 1 to give a uniform film free of air bubbles.

Comparative Example 1

Example 1 was repeated in the same manner as described except that no PCL was used.

Examples 6-9

Example 1 was repeated in the same manner as described except that the amount of PCL was changed to 889 g (Example 6), 3429 g (Example 7), 8000 g (Example 8) and 18667 g (Example 9).

Water Resistance

Example 10

Each of the films (0.1 g) obtained in Examples 1-9 and Comparative Example 1 was sliced to a thickness of about 100 μm. The sliced sample was placed into a flask containing 20 ml of water at 30° C. and shaken for 16 hours while maintaining at that temperature. The mixture was then filtered and the filtrate was measured for its total organic carbon concentration (TOC). The results are summarized in Table 1 below.

Biodegradability

Example 11

Each of the films (0.1 g) obtained in Examples 1-9 and Comparative Example 1 was sliced to a thickness of about 100 μm. The sliced sample was placed into a flask containing 20 ml of water containing alpha-amylase and lipase and shaken for 16 hours while maintaining at 30° C. The mixture was then filtered and the filtrate was measured for its total organic carbon concentration (TOC). The results are summarized in Table 1 below.

In Table 1, the term "total water content" refers to percentage of water based on the weight of starch on dry basis and the term "content of gelatinized starch" refers to percentage of the weight of the starch on dry basis based on the total weight of the starch and PCL.

TABLE 1

| Example No. | Total Water Content (%) | Content of Gelatinized Starch (%) | $n_s/n_e$ | Water Resistance TOC (ppm) | Biodegradability TOC (ppm) |
| --- | --- | --- | --- | --- | --- |
| 1 | 25 | 80 | 14.2 | 24 | 1747 |
| 2 | 30 | 80 | 3.2 | 28 | 1877 |
| 3 | 40 | 80 | 0.9 | 34 | 1970 |
| 4 | 15.2 | 80 | 43.5 | 4 | 1624 |
| 5 | 6 | 80 | 93.7 | 4 | 1451 |
| 6 | 25 | 90 | 14.2 | 30 | 1710 |
| 7 | 25 | 70 | 14.2 | 22 | 1045 |
| 8 | 25 | 50 | 14.2 | 10 | 650 |
| 9 | 25 | 30 | 14.2 | 6 | 443 |
| Comp. 1 | 25 | 100 | — | 700 | 1510 |

From the results shown in Table 1, it will be appreciated that the TOC values in the water resistance test of the films of Examples 1-9 are much lower than that of Comparative Example 1. This indicates that the dissolution of starch in water was reduced in the case of the films of this invention. Especially, the films of Examples 4, 5, 8 and 9 in which PCL forms a matrix exhibit excellent water resistance. The results of the biodegradability test summarized in Table 1 show that the films of this invention have satisfactory biodegradability. The TOC value of a film formed only of PCL is found to be 350 ppm.

Preparation of Plastic Materials

Example 12

Acid-treated starch (9281 g) having a water content of 13% was placed into a kneader, over which was sprayed a mixed liquid consisting of 719 g of water and 800 g of glycerin. The total water content is 25% based on the weight of the starch on dry basis. The glycerin content is 10% based on the weight of the starch on dry basis. After the contents in the kneader had been kneaded for about 1 hour, 2000 g of polypropiolactone were added and the mixture was kneaded for about 30 minutes. The resulting mixture was charged into a hopper of a biaxial extruder and extruded through a T-die at a feed rate of 15 kg/hour, a screw revolution speed of 60 rpm and a barrel temperature gradient of 30°-85°-105° C. to obtain a uniform, flexible film free of air bubbles. The $n_s/n_e$ value was found to be 14.2. The film was tested for water resistance and biodegradability in the same manner as above to reveal that the TOC values in water resistance test and biodegradability test are 81 ppm and 2211 ppm, respectively.

Example 13

Example 12 was repeated in the same manner as described except that white dextrin and polyethylene adipate were substituted for the acid treated starch and the polypropiolactone, respectively. The $n_s/n_e$ value was found to be 81.3. The film obtained was tested for water resistance and biodegradability in the same manner as above to reveal that the TOC values in water resistance test and biodegradability test are 70 ppm and 1300 ppm, respectively.

What is claimed is:

1. A biodegradable plastic material comprising a mixture of gelatinized starch with a biodegradable, aliphatic polyester resin having a melting point of 45°-130° C.

2. A biodegradable plastic material as claimed in claim 1, wherein the amount of said gelatinized starch is 2-98% based on the total weight of said aliphatic polyester resin and said gelatinized starch.

3. A biodegradable plastic material as claimed in claim 1, wherein said aliphatic polyester resin is a polycaprolactone.

4. A method of producing a biodegradable plastic material comprising the steps of:
    providing a blend containing gelatinized starch and a biodegradable, aliphatic polyester resin having a melting point of 45°-130° C.; and
    kneading said blend at a temperature higher than the melting point of said aliphatic polyester but lower than the decomposition temperature of said gelatinized starch in the presence of water in an amount of 1-45% based on the weight of said starchy substance.

5. A method as claimed in claim 4, further comprising molding said kneaded blend into a desired shape.

6. A biodegradable plastic material comprising a matrix of a biodegradable, aliphatic polyester resin having a melting point of 45°-130° C., and gelatinized starch dispersed in said matrix and is present in an amount of 30-90% based on the total weight of said aliphatic polyester resin and said gelatinized starch.

7. A biodegradable plastic material as claimed in claim 6, wherein said aliphatic polyester resin in a polycaprolactone.

8. A process for producing a biodegradable plastic molding, comprising the steps of:
    providing a molten mixture containing a biodegradable, aliphatic polyester resin having a melting point of 45°-130° C. and gelatinized starch, wherein the weight ratio of said polyester resin to said gelatinized starch is 10:90 to 70:30; and
    extruding said mixture through a die under the conditions satisfying the following expressions:

$$100 > n_s/n_e \geq 0.8$$

$$n_e \geq 600$$

wherein $n_e$ and $n_s$ stand for the viscosity, in terms of poise, of the aliphatic polyester resin and the gelatinized starch, respectively, at the extrusion temperature.

9. A process as claimed in claim 8, wherein said molten mixture further contains water in an amount of 1-45% based on the weight of of said gelatinized starch.

10. A method of producing a biodegradable plastic material comprising the steps of:
    providing a blend containing a non-gelatinized, granular starch and a biodegradable, aliphatic polyester resin having a melting point of 45°-130° C.; and
    kneading said blend at a temperature higher than the melting point of said aliphatic polyester but lower than the decomposition temperature of said starch in the presence of water in an amount of 1-45% based on the weight of said starch to gelatinize said starch.

11. A method as claimed in claim 10, further comprising molding said kneaded blend into a desired shape.

* * * * *

UNITED STATES PATENT AND TRADEMARK OFFICE
CERTIFICATE OF CORRECTION

PATENT NO. : 5,256,711
DATED : October 26, 1993
INVENTOR(S) : TOKIWA et al

It is certified that error appears in the above-indentified patent and that said Letters Patent is hereby corrected as shown below:

Col. 1, line 11, delete "to the" and insert --its--.

Col. 3, line 54, ">900" should read --$\geq$ 900--.

Col. 5, line 46, "13%" should read --13.8%--.

Col. 6, line 36, "in" should read --is--.

Signed and Sealed this

Nineteenth Day of July, 1994

Attest:

BRUCE LEHMAN

Attesting Officer  Commissioner of Patents and Trademarks

UNITED STATES PATENT AND TRADEMARK OFFICE
CERTIFICATE OF CORRECTION

PATENT NO. : 5,256,711
DATED : October 26, 1993
INVENTOR(S) : TOKIWA et al

It is certified that error appears in the above-indentified patent and that said Letters Patent is hereby corrected as shown below:

On the title page, Item [73] Assignee should read —Director–General of Agency of Industrial Science and Technology; Research Instititut of Innovative Technology for the Earth and Chu Kagaku Co., Ltd.—

Signed and Sealed this

Sixth Day of December, 1994

Attest:

BRUCE LEHMAN

*Attesting Officer*   Commissioner of Patents and Trademarks